US008799265B2

(12) United States Patent
Johnson et al.

(10) Patent No.: US 8,799,265 B2
(45) Date of Patent: Aug. 5, 2014

(54) SEMANTICALLY ASSOCIATED TEXT INDEX AND THE POPULATION AND USE THEREOF

(75) Inventors: Bruce Johnson, Sherwood Park (CA); Chad Frederick, Edmonton (CA); Scott Montgomerie, Edmonton (CA); Allen Yee, Edmonton (CA)

(73) Assignee: Semanti Inc., Edmonton, Alberta (CA)

( * ) Notice: Subject to any disclaimer, the term of this patent is extended or adjusted under 35 U.S.C. 154(b) by 339 days.

(21) Appl. No.: 13/062,793

(22) PCT Filed: Sep. 8, 2009

(86) PCT No.: PCT/CA2009/001241
§ 371 (c)(1),
(2), (4) Date: Jul. 25, 2011

(87) PCT Pub. No.: WO2010/025565
PCT Pub. Date: Mar. 11, 2010

(65) Prior Publication Data
US 2012/0023104 A1  Jan. 26, 2012

(30) Foreign Application Priority Data
Sep. 8, 2008 (CA) ..................................... 2639438

(51) Int. Cl.
*G06F 17/30* (2006.01)
(52) U.S. Cl.
USPC ............................ 707/711; 707/706; 707/741
(58) Field of Classification Search
USPC .......................... 707/711, 741, 742, 706, 707
See application file for complete search history.

(56) References Cited

U.S. PATENT DOCUMENTS

| 6,643,639 | B2* | 11/2003 | Biebesheimer et al. | 707/709 |
|---|---|---|---|---|
| 7,171,349 | B1 | 1/2007 | Wakefield et al. | |
| 7,185,019 | B2 | 2/2007 | Nayak | |
| 7,219,090 | B2* | 5/2007 | Travis, Jr. | 1/1 |
| 7,672,985 | B2* | 3/2010 | Bookman et al. | 707/755 |
| 7,966,334 | B1* | 6/2011 | Bezos et al. | 707/748 |
| 8,086,600 | B2* | 12/2011 | Bailey et al. | 707/723 |
| 8,214,349 | B2* | 7/2012 | Bookman et al. | 707/708 |
| 8,234,282 | B2* | 7/2012 | Retzlaff et al. | 707/741 |
| 2006/0106793 | A1* | 5/2006 | Liang | 707/5 |
| 2006/0218146 | A1* | 9/2006 | Bitan et al. | 707/7 |
| 2007/0038610 | A1* | 2/2007 | Omoigui | 707/3 |
| 2007/0043723 | A1* | 2/2007 | Bitan et al. | 707/7 |
| 2008/0059153 | A1 | 3/2008 | Bennett | |
| 2008/0140616 | A1 | 6/2008 | Encina et al. | |
| 2011/0055185 | A1* | 3/2011 | Bitan et al. | 707/706 |

FOREIGN PATENT DOCUMENTS

CA  2555280  9/2004

* cited by examiner

*Primary Examiner* — Leslie Wong
(74) *Attorney, Agent, or Firm* — Bookoff McAndrews, PLLC

(57) ABSTRACT

The construction of a semantically associated computer search database is disclosed. A text catalog containing the text particulars and contents of a plurality of electronic documents, a term association database which joins text search terms with their semantic meanings or definitions, and a content association database which contains records associating text search terms and their contextual definitions in respect of individual electronic documents are used to in conjunction provide a text index in which it is possible to search based upon the actual definitions or meanings of certain text or terms within the electronic documents, reducing or refining query search result sets. A method of operating a search engine with the index in question, as well as other e-commerce methods employing the index as a refining tool are also disclosed.

57 Claims, 17 Drawing Sheets

5
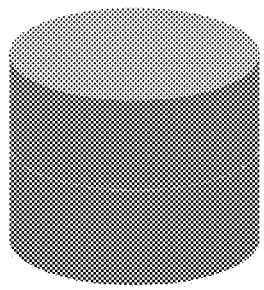
Text catalog DB (2)
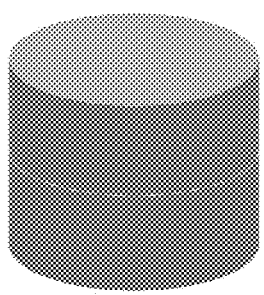
Content association DB (3)
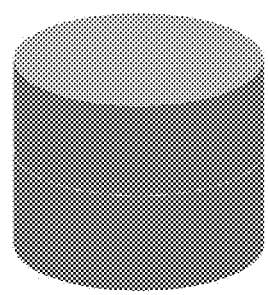
Term association DB (4)
FIG. 5

| URL | Term | Key |
|---|---|---|
| www.apple.com/ | Apple | 1 |
| www.apple.com/ | Apple.com | 2 |
| www.apple.com/ | iPhone | 3 |
| www.apple.com/ | 3G | 4 |
| www.apple.com/ | Enterprise | 5 |
| www.apple.com/ | Maps | 6 |
| www.apple.com/ | GPS | 7 |
| www.apple.com/ | iPod | 8 |
| www.apple.com/ | iTunes | 9 |
| www.urbanext.uiuc.edu/apples/ | Apples | 10 |
| www.urbanext.uiuc.edu/apples/ | University | 11 |
| www.urbanext.uiuc.edu/apples/ | Illinois | 12 |
| www.urbanext.uiuc.edu/apples/ | Extension | 13 |
| www.urbanext.uiuc.edu/apples/ | Varieties | 14 |
| www.urbanext.uiuc.edu/apples/ | Nutrition | 15 |
| www.urbanext.uiuc.edu/apples/ | Orchards | 16 |
| www.urbanext.uiuc.edu/apples/ | Preserving | 17 |
| www.urbanext.uiuc.edu/apples/ | Growing | 18 |
| www.urbanext.uiuc.edu/apples/ | Cider | 19 |

FIG. 7

Term association DB (4)

| Term (9)/Term records | Definition (10)/Definition records | Definition ID (17)/Term association records | Crossreference (18) |
|---|---|---|---|
| Apple | Fruit | 1 | |
| Apple | Personal computer | 2 | 3 |
| Apple | Personal electronics company - California (Symbol: AAPL) | 3 | |
| Macintosh | Variety of apple (fruit) | 4 | 1 |
| Macintosh | Personal computer manufactured by Apple Computer Company | 5 | 3 |
| Toilet | Bathroom fixture | 6 | |
| Water closet | Bathroom fixture | 6 | |

FIG. 9

| Asset ID | Association ID |
|---|---|
| 1 | 2 |
| 2 | 3 |
| 10 | 1 |

FIG. 11

SEMANTICALLY ASSOCIATED TEXT INDEX AND THE POPULATION AND USE THEREOF

This application is the national stage of PCT/CA2009/001241, filed Sep. 8, 2009, which claims priority from Canadian Patent Application Ser. No. 2639438, filed Sep. 8, 2008.

FIELD OF THE INVENTION

This invention is in the field of Internet search engine technology, and is more specifically in the field of the construction and use of a text index which includes the association of different text search terms with their proper semantic definitions, yielding a semantically associated text index.

BACKGROUND

As the volume of content available on the Internet continues to grow exponentially, the importance of Internet search engines and search technology is reinforced. Virtually every Internet user uses one or more search engines such as Google, Yahoo or the like to locate relevant Internet content of interest to them on a more or less frequent basis. With the large quantity of material available on the Internet, various tools and methods for the refinement of search engine results have been created and tested with varying degrees of success.

The most popular search engines available on the Internet, including Google, are primarily based upon the user entering a set of text search terms through a search engine interface and those text search terms are used to extract a result set from the index created or administered by the search engine. One of the limitations however to a purely text-based search is that if you use a text search term which can have more than one definition or meaning, the result set which is retrieved will not be as focused or relevant to the topic of interest as might be desired.

Search engines have endeavored in the past to internally assemble by use of proprietary algorithms or the like ranked indexes of content to inquisitively try to provide more relevant results to the user, or in more likely circumstances to at the very least provide the ability for the search engines to sell higher ranked positions in their index to generate advertising revenue.

To date one of the primary methods by which a provider of search services is able to provide focus or limitation in the results sets to be returned in response to basic text queries such as this is to limit the content within the index—for example, if a particular search provider is interested only in providing medical publication results, then they need to create an index which contains pointers and information relating to medical publication content. In this way, the results returned from a search exercised upon their text index will be limited similarly to the medical publication content contained therein. It would be desirable to be able to provide a method of ranking or limiting search results in a more general text index without the need to physically restrict the types of content which were indexed therein.

Another limitation of purely text-based searching is the search engine provided with a single text search term is not able to provide search results which encompass more than one different word or term having the same definition. In circumstances where different locales or dialects use different words to describe the same thing, it would be necessary to include both or all of those text search terms in the search query fed to the search engine in order to ensure that results were returned from the application of that search query to the index covering the use of all of the different terms sharing the same definition. If there were a way to associate a particular text search term with other similar terms by linking it through its definition this could allow for enhancements in search technology.

All of these various limitations to present-day text-based search engines and search techniques on the Internet are related or traceable in some way to the fact that a text-based search does not itself incorporated into the search criteria or the characterization or prioritization of the search results any one or more actual "definitions" of each of the text search terms which are included in the search query fed to the search engine and applied to the indexing question. By re-orienting or adding to the criteria used in the application of a search query to a particular search engine or index the actual semantics or definitions of those terms, the relevance of the search results can be enhanced. As well, the development of such as searching methodology will allow for the aggregation as it is used by various search users of a semantically associated index of Web content which beyond being indexed in a way that keeps track of various pieces of content solely by the presence of a particular text term therein will over time aggregate the necessary information to understand in the case of terms which might have more than one definition, only one of which might be relevant to the content in that item, what is the proper definition or relevance of the terms present therein and/or whether or not that particular piece of Internet content is actually semantically relevant to the query being submitted and processed. Beyond its use as an enhanced searching tool this type of an Internet text index would have other commercial uses including the ability to provide enhanced relevance in the serving of content such as advertising.

Beyond pure text correlation, one of the primary ways that a user right now can endeavor to narrow down a text search to isolate contents of the definitional nature they desire is to provide multiple text search terms with the proper query operators associating them and by this way endeavor to narrow down the results returned in the execution of a query against the text index [for example if you were looking for references related to apples as fruit, you could execute a query that searched for the terms APPLE and FRUIT, with a view to isolating or minimizing the references that you received in your query result set from a large number of those pertaining to for example, the Apple Computer Company.] Provision of a text indexing tool which will allow for semantic refinement or limitation of the search results would be desirable and effective over what is being done currently in basic text searching.

SUMMARY OF THE INVENTION

It is the object of the present invention to provide an enhancement to traditional text-based search engine technology, used on the Internet and otherwise, to allow for the refinement of text-based search results based upon me definitions of selected text search terms, rendering the search results more semantically accurate or relevant.

The present invention will accomplish its objectives by associating the text search terms selected by a user with predetermined definitions, resulting in the aggregation of a semantically associated text catalog over time.

The invention comprises a semantically associated text index, being a data structure for use in the rendering of semantically associated text searches of one or more electronic documents. The semantically associated text index includes a text catalog, a term association database and a content association database, which are all parts of a data structure which will allow for the rendering of the semantically associated search results. The text catalog will comprise contents records pertaining to at least one electronic document, identifying at least one text search term present in the electronic document. The second aspect of the data structure of the semantically associated text index is a term association database, which will contain term association records corresponding to a text search term with a particular definition. Multiple text search terms can be associated with an individual predefined definition, and multiple predefined definitions can in the inverse be associated with a single text search term. The final element of the data structure of the present invention which is required for its operation is a content association database. The content association database will contain content association records, each content association record basically linking a particular contents records from the text catalog with a particular term association records from the term association database. By linking a reference to a particular electronic document or webpage to a particular term association record corresponding to a text search term appearing in that webpage or asset, the relevant definition of the text search term in question is effectively tag to the electronic document or website in question. The content association database could be pre-populated and is also contemplated specifically to be populated by ongoing or aggregated use of the system of the present invention with this data structure to create additional content association records in the content association database.

This data structure can be used to provide refined and semantically associated search results in a search engine context as well as being used in other applications to for example provide semantically associated advertising content or in other e-business applications where increasing the semantic association or relevance of the results served based on a particular text search term or text search terms would be desired.

In addition to the data structure of the semantically associated text index outlined herein, in both the case of an integrally hosted text catalog or in the context of the remainder of the semantically associated text index being built for use in association with the pre-existing internal or external text catalog, there are also numerous methods of use and apparatus for the use of the data structure of the present invention which are contemplated within the scope hereof. There is for example contemplated a website search engine system which would, by using the semantically associated text index of the present invention, provide the ability for users to conduct enhanced semantically associated searches of a index such as that disclosed and to obtain more contextual relevance in the search results. Again, one of the keys to the ongoing enhancement or improvement of the contents of the semantically associated text indexing question is the ongoing capture or creation of additional content association records in the content association database based upon repeated or subsequent uses of the system of the present invention by users.

In operation of the website search engine or other software methods of accessing the semantically associated text index of the present invention, a user would be provided with the ability to, in the scope of selecting the query parameters for execution against the text catalog, selecting the appropriate contextual definitions for association with text search terms being selected for running against the text catalog. By selecting particular definitions for the terms being used in the search, the results which are retrieved from the text catalog can be refined by association of the selected definitions or consideration of the selected definitions of the text search terms in question against the contents of the content association database. In addition to providing the ability to produce more relevant processed result sets using this method, by associating the proper contextual definitions with each text search term or some of the text search terms by the users, it also makes it possible to either automatically in the background or manually upon some user intervention trigger the creation of additional content association records in the content association database.

The primary means of use of the software method of the present invention is initially contemplated to be by way of the development of a plug-in or interface which will allow for the overlay of the semantic enhancement method of the present invention over top of a pre-existing Internet search engine such as Yahoo, Google or the like. Installation of a plug-in in the web browser of the user which will interact through the appropriate API with the search engine in question will allow for the use of the semantic enhancement method of the present invention with a pre-existing search engine. The method of semantic enhancement of text-based search results as outlined elsewhere herein is also explicitly contemplated within the scope of the present invention.

The software of the present invention could either comprise its own locally installed application, or could be likely more optimally provided as a server-based solution, wherein a Web server, either internal or external, could serve the necessary content to and from client browsers to allow for an interface with the system of the present invention.

One of the methods by which the association of selected text search terms with particular definitions, and particular term association records in the term association database, could be conducted is explicitly contemplated to be the provision of an interface whereby a drop down or a pick list of the corresponding term association records or relevant information therefrom was displayed to a user upon the typing of the particular text search term into the search form of the search engine in question.

A method of serving contextually relevant advertising or other content is also explicitly contemplated. Capturing, either automatically or manually, a definitional association with the term association record from the term association database in the semantically associated text index of the present invention would allow for the searching of contextually relevant advertising content when a user went with their browser to visit a website. In an even more advanced or enhanced version of that semantically associated server method, rather than somehow trying to have the user or the client browser indicate manually or automatically a particular term association, it could also be the case that the development of the necessary content association records in the content association database of the index of the present invention would provide for the primary means of serving contextually relevant information. For example, advertisers wishing to advertise in respect of apples, as fruit, rather than as computers, could purchase that type of an advertising approach from the search engine provider in the search engine provider could in turn know which electronic documents or webpages on the Internet related to apples as fruit, rather than as computers, based upon content association records captured in the content association database of the index of the present invention by users using an otherwise in the search environment.

Provision of a service bureau by which access to be provided to this type of the semantically associated text index for the purpose of enhancing advertising or other content serving is also contemplated to be one embodiment of the present invention.

By providing a data structure within which at least one text search term in a particular electronic document can be associated with its appropriate definition, the method and database of the present invention allow for searching and other e-commerce methods to be conducted with more relevance and accuracy. The data structure itself as well as the method of its population and exploitation are contemplated within the scope of the present invention as is the operation of the service bureau or the exploitation of the semantically associated text index outlined herein as a component of an advertising server.

The text catalog might not be resident in the actual data structure of the semantically associated text index and might rather be the previously created or existing text catalog of a search engine, wherein the use of the semantically associated text index of the present invention along with this at externally hosted or supplied text catalog will allow for the practice of the present invention as an overlay or a refinement to the operation of the search engine or the provider of the text catalog in question.

DESCRIPTION OF DRAWINGS

Preferred embodiments are provided in the accompanying detailed description which may be best understood in conjunction with the accompanying diagrams where like parts in each of the several diagrams are labeled with like numbers, and where:

FIG. 5 is a general data structure demonstrating the necessary components of semantically associated computer text index of the present invention;

FIG. 7 demonstrates a basic example of the data which might be contained in one embodiment of a text catalog in accordance with FIG. 6;

FIG. 9 demonstrates a basic example of the data which might be contained in one embodiment of a term association database in accordance with FIG. 8;

FIG. 11 demonstrates a basic example of the data which might be contained in one embodiment of a content association database in accordance with FIG. 10;

DETAILED DESCRIPTION OF ILLUSTRATED EMBODIMENTS

The following narrative is intended to generally speaking described the operation of the selected illustrative embodiments of the present invention, for the purpose of outlining or enabling its operation to those skilled in the art. Review of this information will, to those skilled in the art, also infer or disclose reasonable modifications or extensions of the described subject matter, all of which are also contemplated within the scope hereof.

PRIOR ART

Present day internet search engines typically provides that a purely text-based search is applied to an index collected or administered by the search engine to yield the first result set which is primarily focused upon the presence of the selected text search terms or words within the content of the pages in question. On occasion, the search engine then also applies some kind of an internal algorithm or refinement which might endeavor to try and definitionally restrict the contents of the search query or to rank them, either by definitional relevance or more likely than not by other advertising factors such as whether or not certain key words have been purchased by advertisers on the search engine etc.

Figure 1:
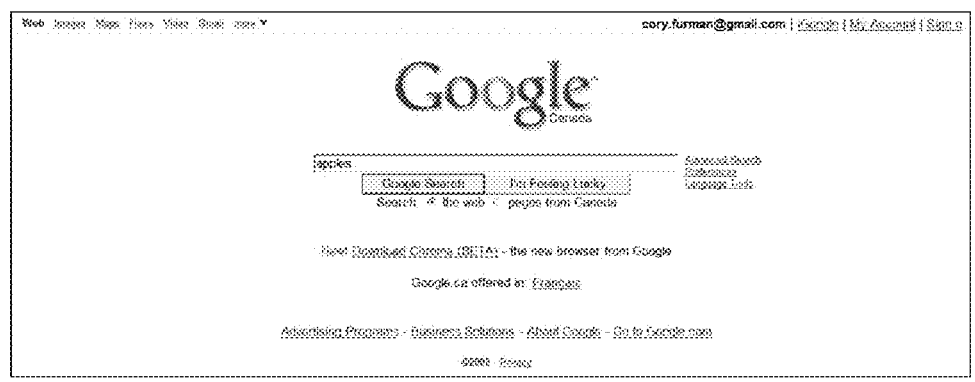
FIG. 1 is a screenshot from the Google Internet search engine, demonstrating the entry of a text query into a prior art text-based internet search.
Figure 2:
FIG. 2 is a screenshot showing the first page of results returned from the execution of the Google text search outlined in FIG. 1.

FIG. 1 is a screenshot from the Google Internet search engine showing the entry of a very basic text search or query for execution against the Google catalog or index. Specifically it can be seen that for demonstration purposes a single text search term, namely the word "apples" has been selected for searching. The first page of the search results of the query shown in FIG. 1 is shown in FIG. 2. It can be seen in that Figure that search results including a number of pages using the word "apples" in numerous contexts are included therein. It can be seen from the contents of those search results that beyond whatever internal ranking or identification has taken place on the raw results from of the Google text index, the results include different webpages in which the phrase "apples" is used in association with various definitions. It is the object of the present invention to provide a superior search enhancement or tool which could be used either on its own or in conjunction with a pre-existing search engine such as Google to limit or further refine search results to focus upon content which contains the text search terms in question but relates them to the specific definition desired by the user, where more than one definition might exist for the text search term or terms in question.

One of the key concepts which differentiates the present invention from the prior art and will result in the assembly of a superior definitionally-oriented text index is the fact that the method by which it is anticipated that text search terms will be associated with definitions in respect of individual content pages or assets will be driven or significantly assisted by the community of search engine users, insofar as the user would select the desired definition of individual text search terms as the search query was configured for submission, and then based upon either the specific selection or submission of the identification of the content in question from the search results as being particularly relevant to the terms in question, or even in an automatic fashion based upon viewing or access of that content from the query results set, the pages in question within the results set would be associated with the proper definitions for the text search terms in question and based on this "community" or aggregation approach, the assembly of a relational index which has individual entries made by some human selection or guidance and criteria applied in its assembly rather than simply being mechanically generated by a computer will result in the higher accuracy and relevancy on a concept level of subsequent search results or uses of the index in question.

Semantically Associated Text Index:

The core of the present invention is a semantically associated text index 5 which can be used to provide refined Internet search engine results as well as being capable of being used in other applications for the refinement of the delivery of various Internet content or services. The text index 5 of the present invention will allow for the conduct of a text-oriented search of a plurality of text-based electronic documents 21. Each electronic document 21 is a webpage or other file which it is desired to include within the index 5 so that can be searched and accessed by a user.

The actual data structure of the text indexing question will be any data structure which is capable of being stored in a memory for access by at least one application program being executed a data processing system. The data processing system in question would be a search engine or other search program employing the semantic associations search methodology of the present invention. The specific details of the data structure could vary based upon the network infrastructure or other tools being used in the operation of the system of the present invention and any modifications or adjustments to the overall concept outlined herein which still result in the end result of practicing the semantic associations search method of the present invention are all contemplated within the scope hereof.

The data structure of the text index will include at least one contents record which corresponds to electronic document. The content record would identify at least one text search term which was present within the electronic document. In addition to at least one contents record, the data structure would also include at least one term association record which signified the connection of a particular text search term, or word, with a particular semantic definition. More than one semantic definition for individual terms to be contained within the database, and more than one term could be associated with a single semantic definition. Finally there would be at least one content association record in the data structure which would link a term association record from the structure with a content record. Basically, the content association record would connect the presence of a particular text search term in an electronic document with the semantic definition of that term in that particular document.

Figure 3:
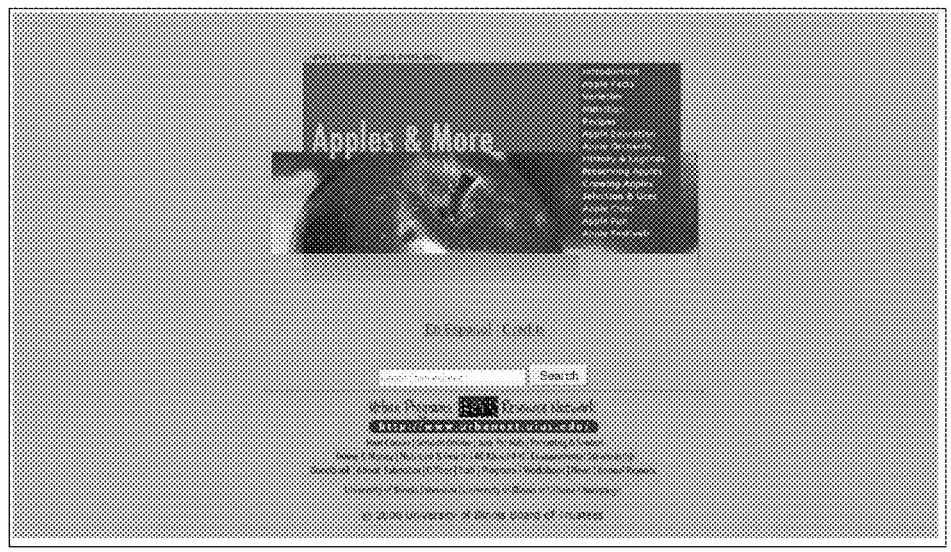
FIG. 3 is a screenshot of the sixth webpage result shown in the Google search result of FIG. 2.
Figure 4:
FIG. 4 is a screenshot of the first webpage result shown in the Google search result of FIG. 2.

FIGS. 3 and 4 are screenshots of two of the results from the search conducted in the Google search demonstrated in FIGS. 1 and 2. In terms of establishing the terminology used in the remainder of this document, each of the webpages shown in FIGS. 3 and 4 would constitute an electronic document 21 which is desired to catalog within the index 5 of the present invention. Insofar as the primary intended use of the present invention is as an Internet search engine, it will be understood that it is primarily contemplated that the electronic documents 21 which will be catalogued and indexed within the present invention will be webpages, but it will also be understood that the technology of the present invention could be used in an internally deployed computer search engine and the use or development of an internally deployed or nonpublic set of tools employing the methodology of the present invention are also contemplated within the scope hereof.

FIG. 5 demonstrates in a very introductory form the three content subsets which will be necessary to deliver the desired functionality of the present invention and form the base of the semantically associated text index 5 which is contemplated herein.

The first content collection which is required for the practice of the present invention is a text catalog 2, which would contain, in an accessible data structure, content records corresponding to each of the electronic documents which is desired to index or search in accordance with the present invention. Dependent upon the design of the data structure in question, the text catalog 2 might contain individual records or links identifying the electronic documents with single text search terms contained therein, or might take some other format which is practical and understood to one skilled in the art of database and indexed design. Overall, the intention of the text catalog 2 is to comprise a listing of all of the words which are found in the individual electronic documents 21 with a key referencing each occurrence of those terms back to the electronic document 21 in question.

The specific methods and means of constructing a bare text catalog will be understood by one skilled in the art—any type of the data structure which is accessible by the remainder of the software components required within the scope of the present invention and which basically outlines the contents of the individual electronic documents in question and associates the text contents of those documents with their identity will be within the scope of the present invention.

Each electronic document 21 is identified in the text catalog 2 by a location identifier 19 and the text contents of each such electronic document 21 are captured in the text catalog 2 typically by a spidering engine or some other similar type of searching approach [the precise method of population of a text index is understood by those skilled in the art of search engine programming and the various approaches which could be taken to that will be understood to be contemplated within the scope of the present invention].

The second key component of the data structure of the semantically associated text index 5 required for execution of the present invention, shown at 4 in FIG. 5, is a plurality of term association records, in this case shown in a term association database 4.

The term association database 4 would contain at a minimum a plurality of term records 23 each corresponding to a particular text search term 9, a plurality of definition records 24 each corresponding to a predefined term definition 10, and a concordance comprising a plurality of term association records 25 each linking a particular term record 23 with a particular definition record 24. Again, there will be obvious modifications or alterations to this type of a basic data structure which will not the part from the scope and intention of the present invention obvious to one skilled in the art of database or search engine indexed design and all such modifications are again contemplated within the scope hereof.

The third element of the semantically associated text index 5 which is shown in FIG. 5 is a content association database 3 which will actually be the key repository of results from the operation of the system of the present invention. While the text catalog 2 and the term association database 4 include the base information upon which semantic associations can be drawn between the use of specific terms 9 having particular definitions 10 in specific electronic documents 21, it is the content association database 3 which will contain the correlation between electronic documents 21, text search terms 9 and definitions 10. In the content association database 4 as shown there are a plurality of content association records, each of which links a particular term association record with a particular content record i.e. links a particular definitionally associated text search term with a particular electronic document.

The method of population and exploitation of the content association database 3 will be explained in more detail elsewhere herein but what is effectively intended is that the content association database 3 would contain cross-references between content records 22 in the text catalog 2 and term association records 25 in the term association database 4 based upon the selection of particular definitions 10 for text search terms 9 from the text search term association database 4 by the user at the time of execution of a query against the semantically associated text index 5. The structure of the content association database 3 then would be that it would contain a plurality of content association records 26, each of which would identify a particular contents record 22 from the text catalog 2 and would also identify a particular term association record 25 from the term association database 4.

The content association database 3, by its correlation of content records 22 with term association records 25, would contain an indication that in the webpage shown in FIG. 4, for example, the use of the term "apples" referred to the Apple computer company rather than apple fruit, which is referenced in the webpage shown in FIG. 3. A sample content association record 26 is shown at the bottom of this Figure. Also shown in the sample record on that Figure is a user identifier which might be included in the contents of the content association database 3 which could be used to provide user specific feedback or functionality in the use of the index 5 of the present invention.

As more searches were conducted by users of the system of the present invention, and more content association records 26 were created in the content association database 3 as more associations between terms and definitions within certain electronic documents was captured, there would be additional strength developed in the content association database 3 insofar as there could actually begin to develop enough data within which to assess the strength or weakness of a particular definitional association with a particular electronic document 21 based upon the number and details of content association records 26 corresponding thereto within the database 3. Again, the detailed operation and assembly of the semantically associated text index 5 of the present invention will be described in further detail elsewhere herein but this gives a general description of the three essential components to the text index 5 itself which are both required for the sake of data capture as well as for the sake of extracting definitionally relevant search results from the text index 5 of the present invention.

While FIG. 5 shows three separate database elements 2, 3, 4 as components of the semantically associated text index 5, it will be understood that separate database elements are simply shown for the purpose of demonstrating different approaches which could be taken to the data structure in question and that all three of those database elements could also be a part of one single relational database. The specific data structure chosen for execution of the method of the present invention will, it will be understood by those skilled in the art, be capable of modifications or rendering in various forms are types without departing from the intended or described form and function outlined herein.

Text Catalog:

The semantically associated text index 5 of the present invention could contain its own integrally hosted text catalog 2, or could rely upon an externally hosted text catalog 2. In the context of an integrally hosted text catalog 2, the search engine system of the present invention could contain its own set of spidering components or other necessary software tools capable of aggregating and building, along with providing access to, a text catalog 2 containing an index of the details of a plurality of electronic documents 21, along with their location identifiers 19.

In the case of reliance upon an externally hosted text catalog 2, the search engine system of the present invention would not itself need to contain the software components to actually aggregate or construct the text catalog 2 from the contents of the plurality of electronic documents 21 cataloged therein. It is specifically contemplated that the remainder of the system of the present invention could be constructed such that a pre-existing search engine with an appropriate API could be used as the text catalog 2 upon which the remainder of the method of the present invention could be constructed or practiced. This would lessen the infrastructure requirements on the system of the present invention and there are many different search engines or text catalogs 2 available at present which have very effectively and efficiently accomplished their objectives of building a text catalog 2 and will in appropriate circumstances make that available to outside systems or vendors.

The specific data structure of the text catalog 2, or its operation in terms of the execution of a text-based search query, can vary, so long as the general concept of the conduct of a text-based content query can be accommodated by that text catalog 2 and the associated software components which are used to access and search the contents records 22 contained therein which correspond to the occurrence of particular text search terms 9 within particular electronic documents 21.

Figure 6:
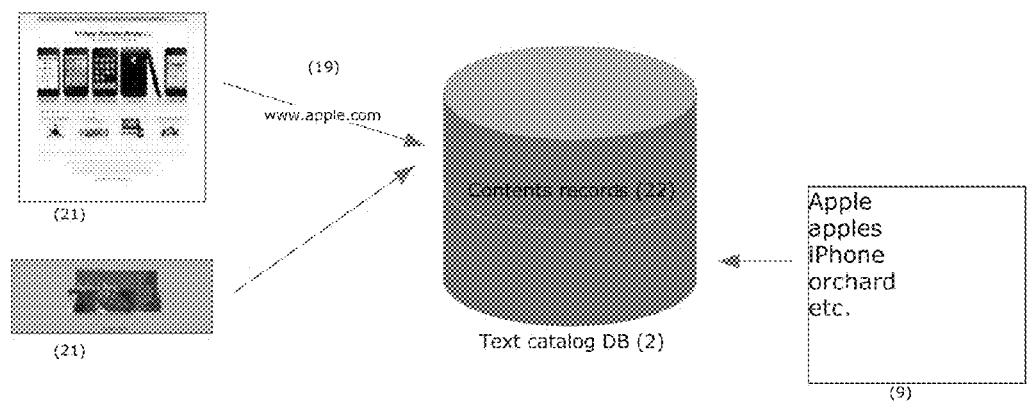
FIG. 6 demonstrates in further detail one embodiment of the basic content of the text catalog component of the text index of the present invention.
Figure 8:
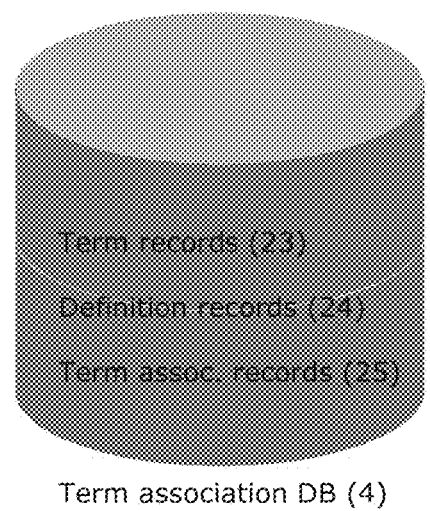
FIG. 8 demonstrates in further detail one embodiment of the basic content of the term association database component of the text index of the present invention.
Figure 10:
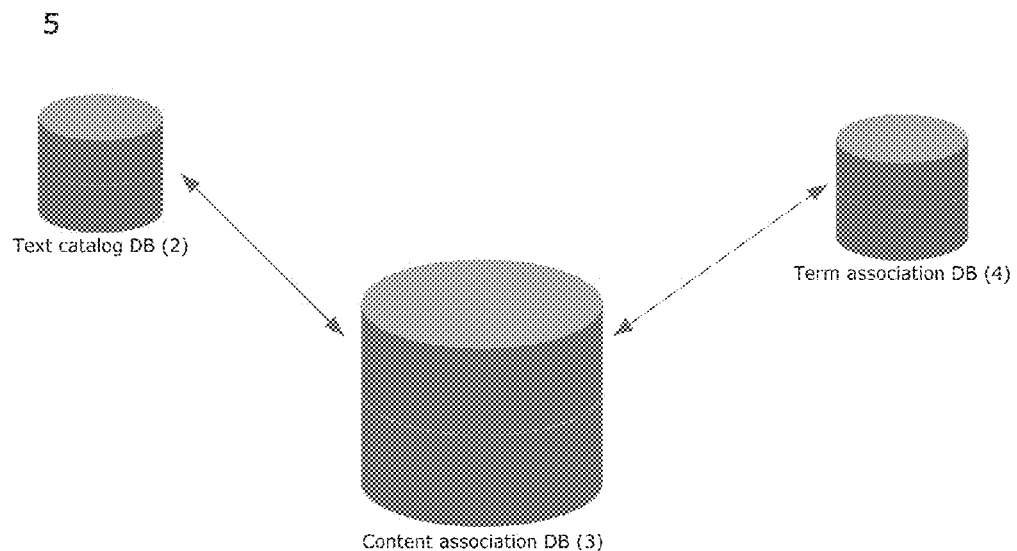
FIG. 10 demonstrates in further detail one embodiment of the content association database of the index of the present invention, connecting the term association database and the text catalog.

FIG. 6 is intended to demonstrate the information that would be contained within the text catalog 2—each of the electronic documents 21 to be indexed [which are shown here as to webpages] would be identified in the text catalog by their URL or location identifier 19, and the text catalog 2 would also include a listing of the various text terms 9 occurring in those electronic documents 21 so that a text-based search, forming the basis of the remainder of the system of the present invention, could be executed based upon this particular table or data structure identifying the existence of certain text terms 9 within the electronic documents 21 in question.

The text catalog 2 which is shown in this Figure is shown as a separate part of the data structure for the purpose of demonstrating the possibility of either an internal or external connection or availability of the text catalog 2 as a part of the overall structure of the semantically associated text index 5 up the present invention. It will be understood that the text catalog 2 along with the remaining components shown in FIG. 5 could each be administered as a separate portion of a distributed data structure, or in certain circumstances might all be tied together in a single relational database, and that the precise nature of this structure or so long as those components remain effectively the interoperable to accomplish the remainder of the objectives of the present invention are contemplated herein.

FIG. 7 is demonstrative of one embodiment of a text catalog 2 as might be used or accessed in accordance with the present invention. The text catalog 2 would contain a plurality of contents records, each corresponding to an occurrence of a particular text search term 9 within a particular electronic document 21, and identifying the electronic document 21 in question. In this particular case a basic selection of visible terms have been selected from each of the two screenshots demonstrated in FIGS. 3 and 4 simply for the purpose of providing a general demonstration of the anticipated content of a basic text catalog 2 in accordance with the present invention. Finally, shown in this Figure is a record key or a record identifier 20 which again could be used for cross-referencing and data handling purposes and will be understood both in its application and utility by those skilled in the art of database programming.

The specific nature of the data structure which is used in a text index to properly catalogue and even prioritize based on the recurrence or prevalence of particular text search terms in particular pages will be understood to those skilled in the art and is to a large degree not relevant to the discussion herein. As well it is contemplated that there may be data structures which could be used within the text catalog 2 which would minimize the number of contents records 22 by perhaps identifying in relation to individual electronic documents 21 more than one term 9 contained therein and that such optimizations in the data structure are contemplated to not depart from the scope and intention of the present invention.

The creation or maintenance of the text catalog component 2 of the system of the present invention can be done in many conventional ways—it is primarily contemplated that the remainder of the system of the present invention would rely upon a pre-existing text catalog component 2, either hosted internally or more likely hosted externally by one or more search engine companies, and the semantic associations which will be conducted by the use of the system of the present invention could be maintained separately by the system of the present invention and then integrated with the text catalogs 2 of the search engine to provide results.

Association of Terms and Definitions:

At the heart of the creation of the semantically associated text index of the present invention is the inclusion of the term association database 4 component or similar structure within the index 5 as a whole. One of the key elements to the success of the present invention is the ability or the necessity to be able to associate particular words or text search terms with their dictionary definitions [or perhaps slang definitions, trademark definitions etc. in terms of developing a full spectrum of the different uses of particular text search terms].

Specifically, the term association database 4 would contain at a minimum a plurality of term records 23 each corresponding to a particular text search term 9, a plurality of definition records 24 each corresponding to a predefined term definition 10, and a concordance comprising a plurality of term association records 25 each linking a particular term record 23 with a particular definition record 24. The use of this type of the structure including the term association records 25 will allow for many to many relationships to exist in the term association database 4, whereby a single term 9, represented in a term record 23, can be associated with more than one predetermined definition and its corresponding definition record 24 by the existence of the corresponding number of term association record 25 and similarly one definition, represented by definition record 24, could be correlated to more than one term 9 and its related term record 23 again by the creation of multiple term association records 25 or pointers in that portion of the data structure.

A predefined list of definitions 10 will be used so that definitive cross-references between related terms 9 and different terms 9 sharing similar definitions 10 can be established in the dataset maintained by the system of the present invention. Use of a predetermined list of definitions 10 in the semantically referenced text index 5 will also be key to streamline the user selection and data entry process. One of the other benefits to the use of a predetermined list of definitions from which the desired definition for a particular term can be selected is that multiple terms sharing a single definition can be cross-referenced or defined so that the execution of a search query seeking content using one of the related text search terms can, by incorporation or reliance upon that cross-reference also pull up references to other content which may be related to the same definition that use other text search terms sharing that same definition rather than the words selected by the user in the search query.

As a starting point it is contemplated that the term association database 4 of the present invention would include complete sets of definitions from one or more dictionaries, so that when the remainder of the system of the present invention was presented with a particular word or text search term it was able to generate a list of possible or probable definitions of that term which could be associated. FIG. 9 demonstrates a sample of a snippet from one embodiment of a term association database 4 which might be used in accordance with the remainder of the present invention. It will be understood by one skilled in the art as the specific data structure of the term association database numeral for or that component of the remainder of the index 5 of the present invention could take many forms dependent upon the software tools used to execute the remainder of the system and method of the present invention.

The specific nature of the data structure of the term association database 4 is in large part not relevant to the operation of the system of the present invention and on that basis could be executed in many ways without departing from the scope hereof. In this particular example, there is shown a sample of a database table with four columns. There is shown a column containing a listing of potential text search terms 9, potential definitions corresponding to those text search terms 10, as well as a serial identifier for each record in the database shown at 17 and a cross-reference field shown at 18.

Referring briefly to FIG. 9 to demonstrate further some of the association concepts, it can be seen that the term 9 "apple" for example at least three predetermined definitions 10 in that table. [There likely would be more if different commercial sources, trademarks, dictionaries etc. were included in the table but this should be sufficient for demonstration purposes]. Based on whatever number of definitions 10 are stored within the term association database 4, a pick list of those definitions could be presented to a user to basically select the proper definition 10 for the term "apple" 9 if they wish to use that term in the execution of a semantically enhanced query. The most relevant located results can then be tagged the definitions 10 chosen for the text search terms 9 by the user so that in the future, additional searches which are conducted by the user, or by other users of the system, can then rely on the fact that one or more references have previously been tagged as relating to Apple "fruit" rather than Apple the computer company.

Dependent upon the data structure used in the term association database 4, the term records in 23, definition records 24 and term association records 25 may comprise separate records in separate data structures, or it is also contemplated that there could be a circumstance in which there would simply be a term association record 25 created in respect of each term 9 and definition 10 pairing.

Association of Related Terms:

The "definition ID" 17 could potentially just be any serial key which would be applied to individual entries in the definition table or data structure in a typical database. The generation or application of such a key to entries or records in the database will be known and understood to those skilled in the art. One of the primary benefits to using a single centralized set of definitions 10 is that based on the use of this key 17, searches executed using this type of a database or an index could include references to other terms 9 which share the same definition 10 but which may not be spelled in any way remotely similarly to the text search term 9 selected by the user so they may not otherwise be returned. One simple example of this which is demonstrated in the table is if a user was searching for some type of information on the Internet about repairing their "toilet". The table demonstrates that the phrase "toilet" shares the same definition 10 with the phrase "water closet", so that the text index and system of the present invention could return relevant results which ranked "water closet" references similar to those based on the word "toilet" even though the user may not have selected one or the other of those two text search terms 9. The sharing of a single definitional record is demonstrated by the same definition ID 17 being used on each of those two records in the table demonstrated. The ability to extract information and provide further detailed results to the user with these associations of different terms which share similar definitions even though they do not share the same spelling or context is one of the key benefits to the approach taken by the present invention to provide contextually or semantically enhanced text search results.

One final item which is demonstrated by the "cross-reference" 18 column in FIG. 9 is that of the ability to over time accumulate cross-references 18 in the database 4 between potentially related and yet not definitionally equivalent terms 9. For example, the Figure demonstrates a link between different records in the ontology of terms related to the Apple Computer entries. A search for "Macintosh" in which Macintosh computers, rather than Macintosh apples, were the desired search results could somehow direct the user to additional references related to Apple Computer as a logical extension of the search.

Content Association:

At the heart of the present invention is a content association data structure 3 within the index 5, within which the association of particular electronic documents 21 with the particular definitions 10 of particular terms 9 appearing therein is contained. Extending the basic analogy or example from above related to differentiation between Apple Computer and apple fruit, by keeping a data structure within which various content items can specifically be associated with definitions of terms allows the Internet search user for example to effectively ask the question of a search engine "find me references related to macintosh apples" which will then theoretically either ignore or demote in the search results items related to Apple Computer or other definitions of the term "apple". This is the key concept at the heart of the entire invention.

The content association database 3 of the overall text index 5 contemplated herein would effectively create a bridge between the text catalog 2 and the term association component 4. It is specifically contemplated that the content association database 3 would contain content association records 22 which would effectively match up the occurrence of particular terms 9 having particular definitions 10 within particular electronic documents 21. Mechanically it is contemplated that the content association database 3 would actually be populated by use of the search engine of the present invention by users—upon execution of the query using the system of the present invention, described in further detail below, upon identification of certain electronic documents 21 by the user that are particularly relevant to the text search terms 9 chosen and the definitions 10 desired, content association records 26 would be created in the content association database 3 on this basis so that in the execution of a subsequent query by the same or another user seeking content related to a particular definition of a particular text search term, the association of that particular definition and text search term in the term association database 4 with respect to the particular electronic documents in question would have previously been catalogued and could be used to refine or serve back a targeted result to the search engine user.

Figure 11:
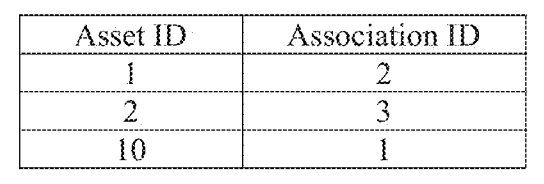

FIG. 11 demonstrates an example of one embodiment of a basic content association database 3 or a sampling of records there from—the content association database 3 would be capable of being modestly pre-populated by the operator of the system of the present invention but it is primarily contemplated that the content association database 3 would be populated by the use of the search engine of the present invention by users. Referring to the data sample which is shown for demonstrative purposes in FIG. 11, there are three sample records shown, each of which can be used to demonstrate a particular definitional correlation or definitional use of the term "Apple" in a different web page or a different context. Referring firstly to the first content association record 26 shown in that Figure, the informational asset record or key that is provided there is 1 which if we refer back to the sample text catalog 2 in FIG. 7 points to the apple.com homepage. The cross-reference or term association record 25 to which that particular content association record 26 points is numbered 2—referring to the sample of the term association database 4 in FIG. 9 that particular term association record 25 points to the definition of the term "Apple" as a personal computer. Therefore a search of the text catalog 2 for the term "apple", a when combined with the content association record 26 outlined herein, indicates that according to this system, the page www.apple.com uses the word "apple" to refer to a personal computer. The second sample content association record 26 shown in that Figure indicates that the use of the phrase "apple.com" in the www.apple.com webpage refers to Apple Computer, as a company in California. Finally, the third sample record shown that Figure indicates that the word "apple" where it is used in the University of Illinois extension division Apple links page showing FIG. 3 refers to the apple as a fruit rather than to the company. It is believed that the addition of this measure of semantic or definitional relevance to otherwise basic text-based search results in an Internet search engine context will be appreciated or understood from the nature of this demonstration so far in this document. It is explicitly and specifically contemplated that a semantically associated text index 5 such as is outlined herein, the data structure of this index 5 itself, for use in searching or other e-business models, is within the scope of the present invention. Specifically, the aggregation and subsequent exploitation of this semantically associated text index 5 for use in the serving or delivery of contextually relevant advertising on the Internet is understood to be covered by the scope of this disclosure as the use of the semantically associated text index 5 of the present invention as outlined herein as a tool for enhanced delivery of targeted advertising and content will be understood by one skilled in the art of search engine and server development to be primary and key to the economic benefit delivery by this invention.

Overview of System Components and Operation:

At the heart of the invention is a semantically associated text index, and its collection or aggregation by capturing the definitional associations of various text search terms appearing in various electronic documents identified within the index with a predefined list of definitions so a subsequent user selecting the same or other text search terms and relating to the same definition will be able to identify similar content It is also contemplated within the scope of the present invention that the use of that index 5 as a component of a search engine is explicitly contemplated herein, along with the use of that index as a component of a selective content serving platform.

Hardware:

In providing an example of one embodiment of a website search system in accordance with the present invention we will generally speaking outline a single hardware configuration for the operation of a search engine system in accordance with the present invention relying upon an externally hosted text catalog 2. There are virtually endless ways of configuring different hardware and software combinations to render or practice the search method and information aggregation method of the present invention and as such the outline of a single hardware configuration here is not intended to provide any restriction on the scope of the allowable subject matter of the present invention insofar as any such modification to the design of the infrastructure of such an embodiment does not depart from the overall scope or intention of the present invention and its use in the provision of semantically oriented search services.

Figure 12:
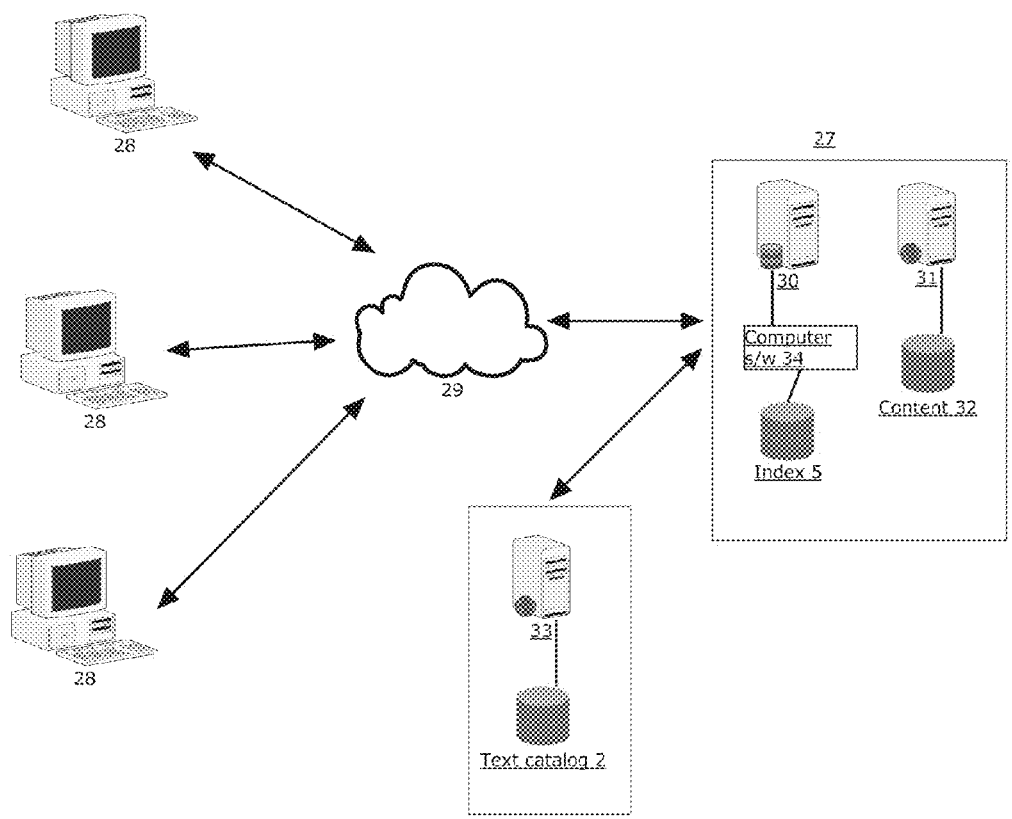
FIG. 12 is an architectural diagram of one embodiment of a search engine system which would allow for the practice of the method of the present invention.

Referring to the embodiment of a search engine website system demonstrated in FIG. 12, there is shown a typical data processing system or environment which will be understood to those skilled in the art of website and web infrastructure design. There are firstly shown a plurality of client computers at 28 which would each be equipped with a browser capable of accessing content served from the website system 27 of the present invention as well as from other websites or servers connected to the Internet. The network connection of those client computers 28 to the system 27 of the present invention and elsewhere is demonstrated by the TCP/IP cloud shown at 29.

As indicated above, the particular embodiment of the website system 27 of the invention shown in this Figure is reliant upon an externally provided text catalog 2—as outlined above, it is explicitly contemplated that one of the primary applications of the service provided by the website of the present invention will be to effectively act as an "overlay" on top of an existing search engine such as Google, Yahoo or the like. In this particular case the externally hosted text catalog 2, and a related server 33 are shown also in communication with the website search engine system 27 of the present invention. It is contemplated that the externally hosted text catalog 2 would be the text index of a pre-existing search engine such as Google or the like, who has designed and opened an application programming interface for access to their text index to third parties.

Within the actual website system 27 there is shown in the embodiment of this FIG. 2 servers. There is shown a content server 31, which includes a content store 32, and which would be, within the scope of the remainder of the infrastructure of the website and search engine in question, responsible for serving templates and content related to searches and other interactions of users and their computers 28 with the website 27. There is also shown a search server 30, which contains the necessary computer software components 34 to interact with user computers 28 as well as to interact with the semantically associated text index 5 which is also shown.

The user computer 28 would browse to the website 27 and would interact by serving of content from the servers 30 and 31. For example a search form could be presented at the user computer 28 by the server 30, through which the user of the computer 28 could interact with the searching tool of the present invention by providing and associating particular text search terms 9 with definitions 10, and reviewing search results etc.

The software components 34 on the server 30 would be capable of communication with the database components accessible thereto including the semantically associated text index 5 as well as potentially the content store 32 and the text catalog 2 by way of communication with the external text catalog server 33.

User Interface:

The website system 27 of the present invention could actually be a search engine on its own, connected to a text catalog 2 internally or externally along with the remaining tools outlined elsewhere herein and components necessary to acquire the parameters for a search from a user at a user computer 28, execute the search against a text catalog 2 and a semantically associated text index 5, and to serve back the results of that search to the user.

The other more likely implementation of the method of the present invention is to provide the access to the semantically associated text index 5 of the present invention as an overlay or an enhancement to a pre-existing search engine. Basically what is contemplated is in the case of search engines that have opened an API to developers to allow for integration of third-party components or software with their search engines, a browser plug-in or the like would basically add the functionality of the method of the present invention into the browser of the user while they conducted a search on the website of their chosen search provider.

For example, if the user was partial to using Google to do their text searching, it is possible to design the software of the present invention as a browser plug-in which can access or integrate with the Google search engine through their application programming interface and can basically rely upon the Google engine to conduct the text catalog 2 aspect of the search and serve back the results of the text portion of the search to the plug-in for modification or application of the method of refining the search results based upon the contents of the semantically associated text index 5 of the present invention. Both approaches, namely the standalone software outlined above as well as practicing the method of refining text searches using a semantically associated text index 5 using a plug-in or overlay to a pre-existing search engine through an application programming interface are contemplated within the scope of the present invention.

The data processing system of the present invention where it was delivered as a website system would comprise at least one processor, memory operatively connected to the at least one processor [likely in the Web server], display device operative to display data which would potentially be a client browser, and the program modules stored in the memory and operative for providing instructions to the processor—this would basically be the software components resident on the Web server in the website system or client/server context. The program module would be capable of accessing and delivering semantically associated text search results as outlined in accordance with the remainder of the invention, and would access the data structure as outlined elsewhere herein in terms of the electronic documents catalogued and the association of text terms appearing therein with particular semantic definitions.

In the context of a freestanding software installation, the memory and processor referenced in the claims could refer to a desktop or other type of a personal computer of the user with a freestanding software installed thereon. In order to deliver the maximum benefit in terms of a better populated text index, in the instance where the software was run locally on a local computer rather than in a client/server website model, it is likely the case that the data structure or text index itself would be resident on a server which would be operatively connected with that local computer for communication purposes.

The system could create new content association records between particular electronic documents and terms appearing therein either manually upon the triggering of the creation of a content association record by the user [i.e. in the display of the search results, a flag or something could be provided which the user could click or otherwise interact with to indicate their ranking or de-ranking of that particular search result, which would result in the creation of a content association record in association with the electronic document and text search terms in question]. It could also be the case that the software of the present invention could be programmed to automatically sense interaction with particular search results by the user and automatically create content association records in the system of the present invention in the background. In either case, broadening the population of the text index itself will deepen the utility of the system and the database of the present invention and any type of a particular means of the triggering of creation of content association records within the database in question as is obvious to one skilled in the art of database and website programming are contemplated within the scope of the present invention.

For the sake of describing the remainder of the subject matter herein, we will speak of an embodiment in which we have designed a plug-in to implement the method of the present invention in terms of categorizing electronic documents 21 for cataloging and subsequent use in the content association database 3 of the index 5 of the present invention, as well as applying the refinement of the semantically associated text index 5 of the present invention to a purely text-based search result. We specifically to date have tested this with the Google search engine although subject to modifying the programming of the plug-in to interact with different types of browsers or search engine APIs it will be understood to one skilled in the art that those mechanical modifications do not depart from the intention and scope of the present invention.

Figure 13:
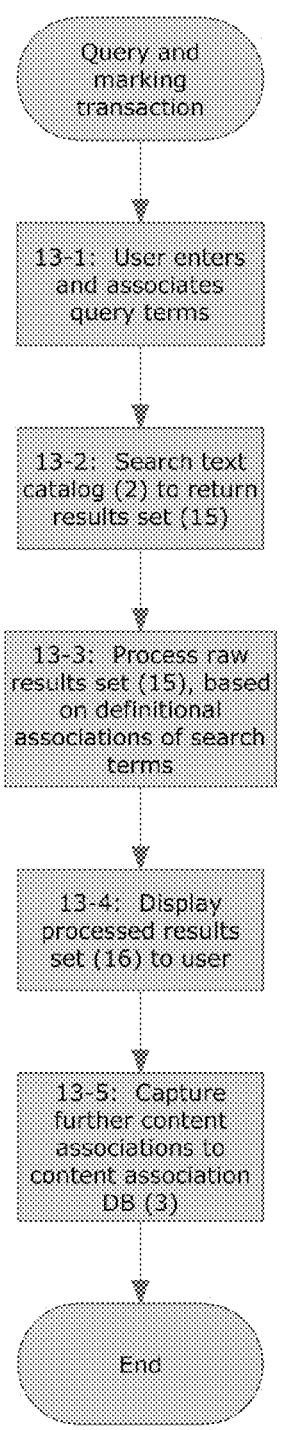
FIG. 13 is a flow chart demonstrating an overview of one embodiment of a search transaction conducted using the text index of the present invention.

Use of the Index in Search:

FIG. 13 is a flow chart demonstrating the general flow of a search transaction through the system and method of the present invention. It is contemplated specifically that the interaction of the user with the system and method of the present invention in this Figure is through a website environment, and more specifically a website environment which presents a search engine interface.

Looking first at Step 13-1, the user would enter their selected text search terms 9 into the search interface. Entry of their selected text search terms 9 would require them to also associate each of their text search terms 9, or selected of their text search terms 9, with one of the predefined definitions 10 of those terms 9 as identified in the term association database 4. An ideal interface for the user in this respect is to provide the user with a pick list of definitions for each term in a drop-down fashion or the like so that as the user enters a word, a drop-down list with a pre-qualified and predetermined list of associated definitions shows below the term and the user can simply select one [or if they wished to not define a particular term in the query they could also be provided with the option to not do so].

The user could be provided with the ability to provide "operators" along with the text search terms in normal fashion as might be understood by those familiar with the use of search engines or querying languages. For example the use of "and", "or" or "not", to expand or restrict the results set, could be allowed within the language and set up of the interface of the system of the present invention.

Following through in FIG. 13, Step 13-2 shows the searching of the text catalog 2 for the text search terms 9 selected by the user. Basically the text catalog 2 would be searched for a raw results set 15 which would basically contain identification of all of the electronic documents 21 contained within the text catalog 2 which contained the selected text search terms 9. At this point the text search terms 9 would have only been identified from the text catalog 2 based on their spelling or their presence in the search results.

The next step, shown at 13-3, is to process the raw results set 15 based on the definitional associations of the text search terms 9 which were previously selected by the user. This step would entail the comparison of the located electronic documents 21 to electronic documents 21 identified by content association records 26 in the content association database 3 to ascertain whether or not any of the results returned in that raw results set 15 had been previously identified within the semantically associated text index 5 as having used the text search term or text search terms 9 in question in association with the definitions 10 selected by the user at the time of entry of the query. For example, had some previous user already populated the content association database 3 with a pointer indicating that a particular electronic document 21 that used the word "apple" referred to apples as fruit rather than apples as computers. If this type of a content association record 26 already existed in the content association database 3 and it was the "apples as fruit" definitional association which the user was seeking when they entered their query and associated their selected text search terms with definitions from the term association database 4, the "processing" of the raw results set 15 might entail the elevation or ranking of those particular identified assets 21 at the top of the search results as potentially being most relevant. As the system of the present invention is used and the population of the content association database 3 increases, the relevance and utility of the search engine and the semantically associated text index 5 of the present invention will be enhanced.

Step 13-4 in FIG. 13 refers to the display of the processed results set 16 to the user. As outlined above, what this contemplates is that if the content association database 3 results in the identification of certain items within the raw results set 15 is being particularly definitionally relevant to the selected text search terms and definitions for the query those would be elevated or highlighted in the search.

Figure 14:
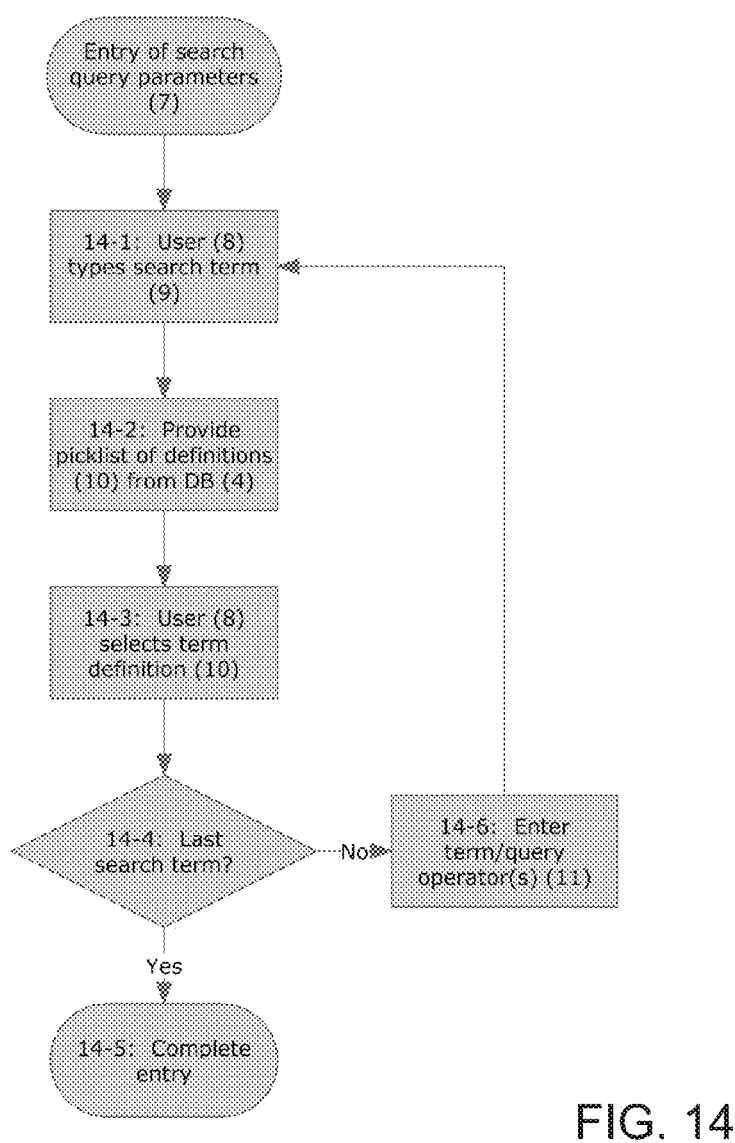
FIG. 14 is a flow chart demonstrating the basic business process and data flow associated in one embodiment with the selection and entry of text search terms by a user into the search engine interface of the present invention.
Figure 15:
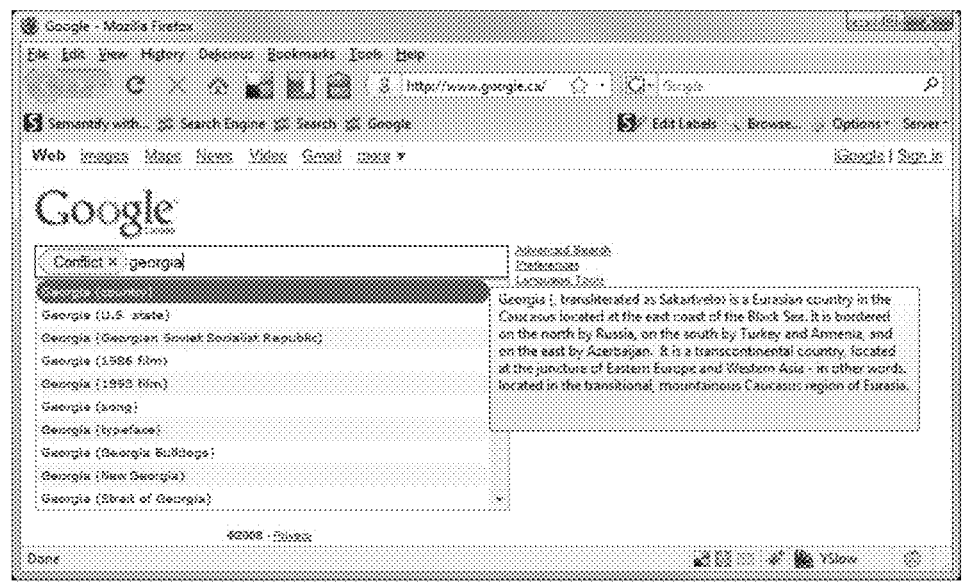
FIG. 15 is a screenshot of one embodiment of the user interface of the present invention wherein the user is being allowed to enter or select definitions for association with text search terms.

FIG. 14 is a flowchart showing in further detail the steps associated with the entry of search query parameters 7 by the user in the initiation of the search transaction using the system or method of the present invention. Shown first at stage 14-1, the user 8 would type in a text search term 9 to a data entry form served to their browser from the search engine. As outlined in general detail above what is contemplated in one embodiment is that the user 8 upon typing in a text search term 9 would be provided with a pick list of various predetermined definitions 10 from the term association database 4 which applied to that particular term 9. The user 8 would then select a definition 10 to associate with the term 9 for the purposes of their query. FIG. 15 shows the presentation of a pick list of definitions in the entry of text search terms in one embodiment of the present invention, where the user has entered the term "Georgia" and the pick list is being provided to allow the user to select the proper "Georgia" to narrow the results set.

They could then go on to enter more text search terms 9 or if they were finished entering text search terms 9 to move on with the execution of their search. Also as outlined above where more than one text search term is being entered standard query operators and language could be used to expand or restrict the scope of the results set. Where query operators were used to expand or restrict the results set, those could either be used to simply expand or restrict the results of the text search on the text catalog 2, or they could be applied to the definitional selections of the text search terms 9 which would result in an even more surgical expansion or restriction of the results set based upon the text search terms 9 selected insofar as the operators would also be centered upon, to the extent that the necessary content association records 26 were available on the content association database 3 the text search terms in question having the appropriate definitions 10 in addition to simply being present within the electronic documents 21 in question.

One of the additional strengths of the method of the present invention is that it allows for the development over time of a dataset within the term association database 4 which can identify different terms which share the same definition—for example the "toilet"/"water closet" example. One of the things which could be done by the system of the present invention would be to feed those alternate terms to the search engine through the API at the time that the remainder of the search is conducted, to enhance the contents of the results.

Display Query Results:

Displaying the search results once processed, as mentioned at Step 13-4, could comprise the ordering or ranking of the raw results set 15 based upon the existence or application of certain content associations from the content association database 3 to the raw results. There are also other means by which the results of the refinement or application of the contents of the semantically associated text index 5 of the present invention to the raw results 15 could be shown to the user, including display of visual indicators, highlights etc. of certain references in the results set etc.

Figure 16:
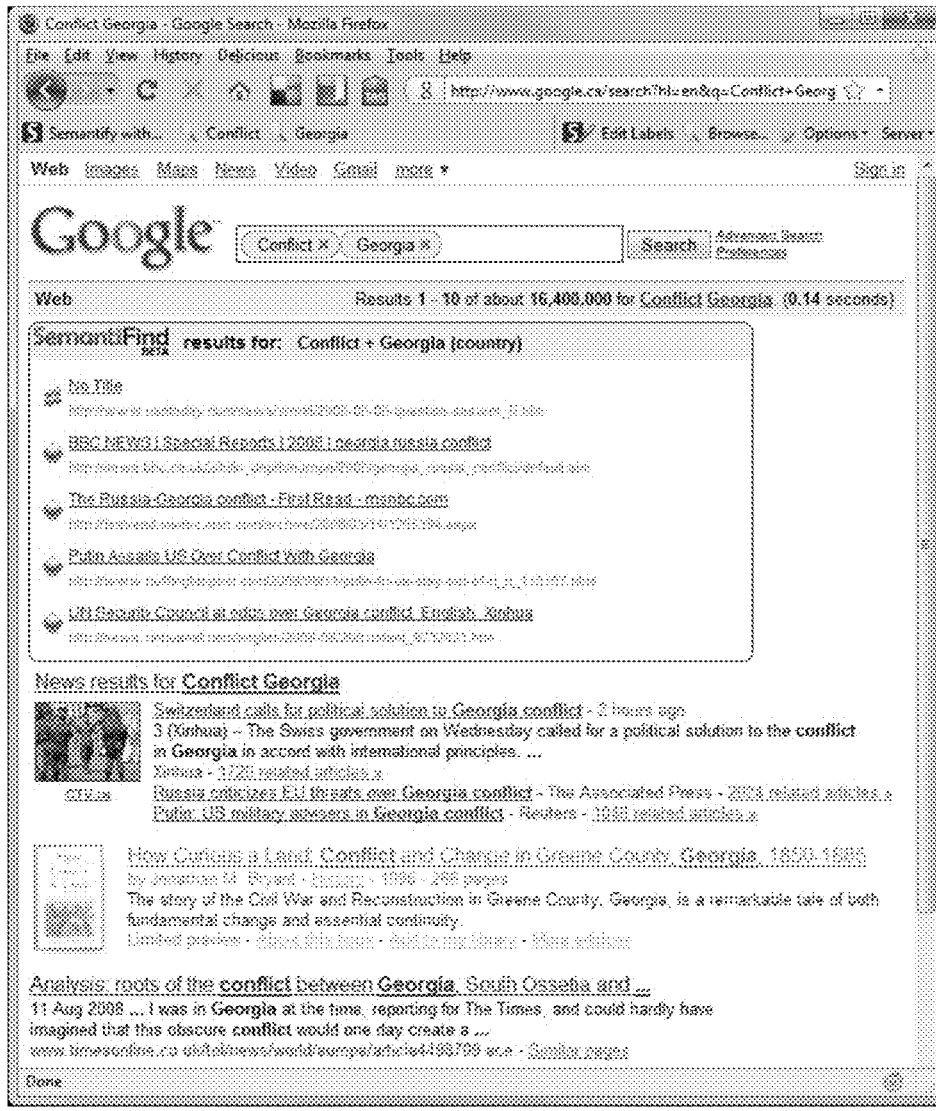
FIG. 16 is a screenshot of one embodiment of a processed results set being displayed in relation to a query executed with the use of the tool of the present invention, wherein the results are being displayed back within a Google search result.

FIG. 16 shows one means of displaying a processed results set 16 in accordance with the remainder of the present invention. In this particular embodiment or circumstance, the interface which is being provided to the search tool of the present invention is through a Google plug-in using the application programming interface therefore. It can be seen that the method chosen for the display of the selected results is to show them in a box at the top of the Google search results, under the heading Semantifind Results. This will be understood to simply be one means of displaying a grouping of results but is demonstrative of the types of displays which could be provided once the semantically associated text index 5 was applied to the raw Google results to identify those results most relevant.

Population of the Content Association Database:

The content association database 3 could be, to a degree, pre-populated with content association records 26 corresponding to a basic quantity of electronic documents 21. However, whether or not the content association database 3 is pre-populated, it is contemplated that the primary method of population of the content association database 3 will be by the capture or creation of content association records 26 in that database 3 by the system 27 of the present invention as the system 27 is used by users to generate searches and relevant electronic documents 21 corresponding to certain definitions of certain text search terms are identified by those users.

One of the primary aspects of the method of the present invention which will enhance its utility over time to all users is that as users conduct searches using the system of the present invention resulting in the creation of further content association records 26 in the content association database 3, the accuracy and utility of the processing ability of the method of the present invention, to reorder, rank or prioritize pure text results in a raw results set 15 based on actual definitional associations of text search terms by users will increase. Every time that a particular electronic document 21 or Web page is located using the search interface of the present invention, a content association record 26 can be created in the content association database 3 for each text search term 9 and its related definition 10 that was selected by the user in the query result in the location of that particular webpage. For example, if at Step 13-1 the user enters and associates six text search terms 9 with specific definitions 10 from the terms association database 4, and the user finds the first eight search results from that processed results set 16 to have been useful or relevant to their query, that can result in the creation of perhaps 48 new content association records 26 within the content association database 3 [in the circumstance where each of the six selected text search terms and their definitions were indicated by the user to be relevant to each of those eight records—basically there would all of a sudden be the ability to say that each of the text search terms where used in each of those eight specific electronic documents 21 had a specific definition.] Step 13-5 in this figure shows that the capture of further content associations to the content association database 3 would take place during the display or review of the processed results set 16. The capture of these content associations during search transactions by users is key to the expansion of the population of the content association database 3 and enhancing over time the efficiency and efficacy of the semantically associated text index 5 of the present invention as a search refining tool.

Capture of content associations for the creation of additional content association records 26 within the content association database 3 could take place in numerous ways. The user could be presented with the ability to manually by clicking their mouse or selecting an option profile a particular electronic document 21 into the content association database 3 in association with their selected text search terms 9—in this type of approach, the user could also be presented with the option to only associate certain of their selected text search terms 9 with the electronic document 21 in question so if for example the user determined that the definition of one of the terms that they had wished to incorporate into the query was not satisfied by the result but the other five, in the example of six being provided, then five content association records could be created in the content association database 3 without creating a content association record 26 in respect of the one term which the user did not feel was accurately defined or represented within the content of the asset 21 in question.

Beyond a manual capture method such as this, whereby upon selection of an option within the browser the user could cause the profiling of a particular asset 21 into the content association database 3 it will also be understood that different types of fully or partially automated capture could be created. For example, if the assumption is made that a search result that is viewed for longer than an introductory period of time, i.e. suggesting or indicating that the user when they clicked into that result from the results set spent enough time looking at it that it can be assumed that they found it useful, it could also be possible to create content association records 26 in the content association database 3 in respect of that result based on the presence of the user's browser on that particular results page for a period of time. In a more elaborately ranked ontology it may be the case that manually ranked pages were given a heavier weighting than the automatically ranked pages. It may also be the case that the weighting of rankings assigned by particular users could be adjusted to be higher or lower based on the quality or quantity of their interaction with the system of the present invention.

Alternate Delivery Environments:

As outlined elsewhere herein it is possible that the semantically associated text index 5 and the system and method of the present invention could be used in various environments either including the delivery of an Internet search engine or search environment, which is the primary immediate intention or goal here, or also the method of the present invention could in another foreseeable iteration be developed for deployment in an internal or closed environment where the necessary tools for the aggregation of semantic association information and the provision of search services might be deployed on an internal or closed network.

Serving Semantically Accurate Content:

One of the key aspects of the present invention is that, beyond the obvious utility of the semantically associated text index 5 in a personal search context, the aggregation of that index 5 and specifically the content association records 26 therein will result in a tool which is of great commercial value in other applications in the Internet context as well. It is for example specifically contemplated that the use of an ontology such as this in the background in the identification and serving of appropriate and relevant advertising content is a key part of the present invention. It can be foreseen that there would be an embodiment of the software of the present invention which could even be developed or implemented by the provider of the text search engine to an aggregated data structure such as that outlined or advocated herein for the purpose of providing targeted and accurate advertising content based on the content of the remainder of the page being served. It is contemplated that the aggregation of the content association database 3 component in the context of the operation of a personal search engine provides perhaps the search engine at no cost to the public, with the benefit of providing an enhanced search experience, and the data which is harvested or gained from the use of that engine by the users could then be used in addition to providing enhanced search services to individuals also to provide at a cost to advertisers or web providers the ability to target or refine the serving of advertising content in conjunction with webpages based upon the contents of the index 5.

Combination of Query Results from Multiple Search Engines:

One additional aspect of the present invention is a method of the combination of search results from multiple search engines using a single user interface. It is contemplated that the execution of searches against multiple search engines or content databases, yielding multiple search results, would be simplified and made easier for a user to interact with and to use if it was possible to execute this type of the searching strategy by single entry of the search parameters in a single search engine, with all of the results being returned and combined for solitary displayed to the user at the interface of that first search engine.

Figure 17:
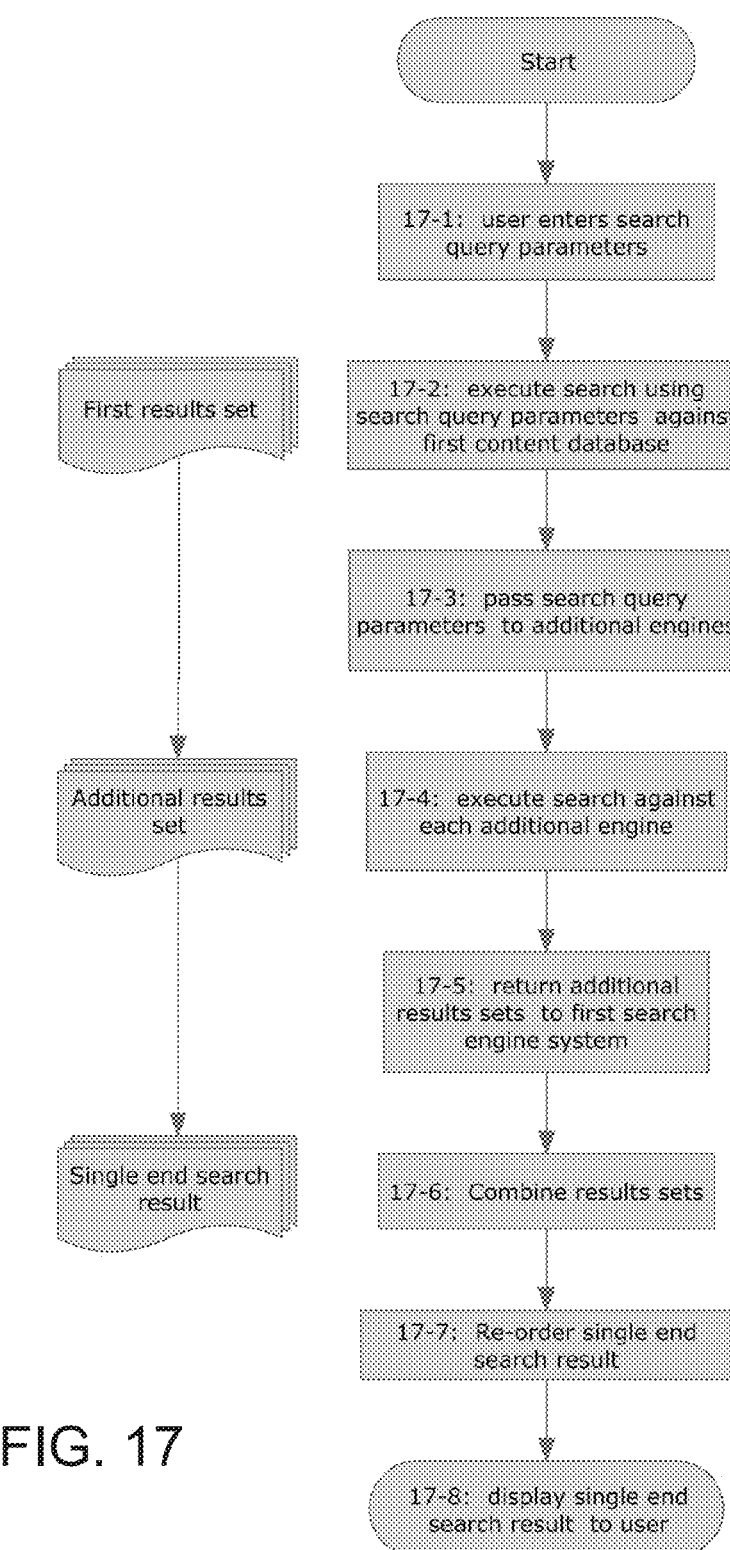
FIG. 17 is a flow chart demonstrating the basic business process and data flow of one embodiment of the combination of multiple search engine query results in accordance with the present invention.

FIG. 17 is a flowchart showing one embodiment of a method of the present invention for the acquisition and display of a combined search result set from multiple search engines. It is contemplated that an approach such as this may be useful both in terms of returning semantically relevant search results in accordance with the remainder of the present invention in addition to results from another search engine, rather than using the semantic engine of the present invention to simply refine the results extracted from another source. In a context of the combination of different search engines search result sets, it would be desirable to be able to rank or blend together the results obtained from more than one search catalog in certain applications.

Referring to FIG. 17, at 17-1, the user would enter their search query parameters through the interface or computer software of the present invention. It is primarily contemplated that the user interface in this case would be a browser plug-in incorporated into the user interface of a pre-existing search engine although it could also as outlined above with respect to the remainder of this invention be a freestanding computer software. In any event, the user would enter their desired query parameters at this step in the process.

The next step in the process, demonstrated at 17-2, would be the execution of the search using the query parameters entered by the user against a first content database. The first content database would potentially be the content database or catalog of the first search engine through which user interface the browser plug-in or other software would be used to obtain user input and provide user output—the first content database in any event could be a search engine or it could be the semantically defined text index of the present invention.

The next step in the process following the execution of the search against the first content database is the passing of the same search parameters to additional search engines or search catalogs—this is shown in the next step 17-3 in this Figure. Basically what is contemplated is that the search query parameters would be passed along electronically to the search engines or software engines associated with the additional content database or database against which it was desired to run the search for inclusion or combination with the contents of the first content database—while it is explicitly contemplated that the combination of two search results from two search engines could be accomplished is also contemplated that more than two search engines could also be searched to provide this type of behavior a result. Searches would be executed against each additional search engine or database, shown at 17-4.

The additional result sets returned from each of the additional search engines or databases searched would be returned in some way to the first search engine system for combination with the first result set. The return of the results set could either be a return of the league to a more exhaustive data file resident upon the additional engine or website system, or it could be a more detailed set of information which was properly formatted or parsed for reading and action by the software of the present invention and/or the software of the first content database for search engine.

The results set from the first search or first content database, and the results sets from the additional content databases, would be combined into a single and search result. Single and search result could then be re-ordered, sorted or otherwise prioritized in advance of its final displayed to the end user. Combination, reordering and display of this information is shown at steps 17-6 through 17-8.

It is explicitly contemplated that this search result combination method, whereby results from multiple search engines would be combined and displayed together in a single user interface, is applicable beyond the scope of the semantic search index outlined elsewhere herein, although it is also explicitly contemplated that the semantic search index herein could be used in combination with the search results from one or more additional search engines to provide for a combined or ranked or prioritized search results as well. The use of this method of combining search results within the context of the semantically defined text index of the present invention, or beyond the semantically defined text index of the present invention, is explicitly contemplated within the scope of the present invention.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A text index, comprising a data structure stored in a memory for access by at least one application program being executed on a data processing system, for use in the preparation of semantically associated text searches of electronic documents in a search engine, said text index comprising:
   one or more content records corresponding to an electronic document, the content records identifying one or more text terms present within the electronic document;
   one or more term association records associating a text term present within the electronic document identified by a content record with a pre-determined semantic definition of the text term;
   one or more content association records linking a term association record of the one or more term association records with a content record of the one or more content records;
   wherein a user is enabled to provide one or more user-defined text search terms desired to be located within the text index;
   wherein, for user-defined text search terms having term association records within the search index, the user is iteratively presented a list of one or more pre-determined semantic definitions associated with each of the one or more user-defined text search terms, enabling the user to select a pre-determined semantic definition of those one or more user-defined text search terms;
   wherein the one or more content association records contained within the text index are searched using the user-defined text search terms to locate electronic documents previously catalogued as containing the one or more user-defined text search terms in association with the selected pre-determined semantic definitions, to form a semantically relevant results set;
   wherein new term association records are updated or created during the use of the text index by enabling a user to select pre-determined semantic definitions for association with user-defined text search terms; and
   wherein new content association records are updated or created during the use of the text index in a search, by associating a particular electronic document with the use-defined text search terms, and selected pre-determined semantic definitions of the user-defined text search terms, used to locate the particular electronic document.

2. The text index of claim 1 wherein the one or more content records are contained within a text catalog.

3. The text index of claim 1 wherein the one or more term association records are contained within a term association database.

4. The text index of claim 1 wherein the one or more content association records are contained within a content association database.

5. The text index of claim 1 wherein the one or more user-defined text search terms are associated with more than one pre-determined semantic definition.

6. The text index of claim 1 wherein the one or more user-defined text search term includes more than one user-defined text search term, and wherein the more than one user-defined text search term is associated with the same pre-determined semantic definition.

7. The text index of claim 1 wherein each of the one or more content records further comprises a location identifier for a respective one of the electronic documents.

8. The text index of claim 1 wherein the electronic document is accessible via the Internet.

9. The text index of claim 1 wherein the location identifier is a network URL.

10. The text index of claim 1 wherein the electronic document is a webpage.

11. The text index of claim 1, wherein upon a subsequent search of the text index seeking to locate a particular user-defined text search term or pre-determined semantic definition, the content association records are used to locate electronic document content that is semantically relevant to the user-defined text search term.

12. The text index of claim 1, wherein the pre-determined semantic definitions selected can be associated with the user-defined text search term in a new term association record within the text index.

13. A method of serving of semantically refined advertising content in websites, wherein a text index in accordance with claim 1 is used to identify semantically relevant advertising content, wherein the advertising content pieces are selected from the electronic documents indexed within the text index, and the text search terms used to identify semantically relevant advertising material are captured from user input or behavior on each respective website.

14. The text index of claim 2 wherein the text catalog is a part of a remainder of the text index.

15. The text index of claim 2 wherein the text catalog is stored on and accessed from a separate computer system.

16. A method of displaying semantically associated text search results using a text index comprising:
   one or more content records corresponding to an electronic document, the content records identifying one or more text terms present within the electronic document;
   one or more term association records associating a text term present within the electronic document identified by a content record with a pre-determined semantic definition of the text term;
   one or more content association records linking a term association record of the one or more term association records with a content records of the one or more content records;
   said method comprising:
      enabling a user to select, in a search engine, one or more user-defined text search terms desired to be located within the text index;
      for user-defined text search terms having term association records within the text index, iteratively presenting to the user a list of pre-determined semantic definitions associated with each of the one or more user-defined text search terms and enabling the user to select a pre-determined semantic definition of those one or more user-defined text search terms;
      searching the content association records contained within the text index using the user-defined text search terms to locate electronic documents previously catalogued as containing the one or more user-defined text search terms in association with the selected pre-determined semantic definition, to form a semantically relevant results set;
      displaying the semantically relevant results set to the user; and
      updating or creating a new content association record during the use of the text index by associating a particular electronic document with the user-defined text search terms, and selected pre-determined semantic definition of the user-defined text search terms, used to locate the particular electronic document, and wherein one or more term association records are updated or created during the use of the text index by enabling the user to select pre-determined semantic definitions for association with user-defined text search terms.

17. A method of displaying a semantically associated text search result from a search engine, using a text index comprising:
one or more content records corresponding to an electronic document, the content records identifying one or more text terms present within the electronic document;
one or more term association records associating a text term present within the electronic document identified by a content record with a pre-determined semantic definition of the text term;
one or more content association records linking a term association record of the one or more term association records with a content record of the one or more content records;
said method comprising:
enabling a user to select, in a search engine, one or more user-defined text search terms desired to be located;
for user-defined text search terms having term association records within the text index, iteratively presenting to the user a list of pre-determined semantic definitions associated each of the one or more user-defined text search terms and enabling the user to select a pre-determined semantic definition of each of the one or more user-defined text search terms;
searching the content association records contained within the text index using the user-defined text search terms to locate electronic documents previously catalogued as containing the one or more user-defined text search terms in association with the selected pre-determined semantic definition, to form a semantically relevant results set;
executing a text search against a search engine for the selected user-defined text search terms, to form a search engine results set;
ranking the search engine results set based upon the contents of the semantically relevant results set;
displaying the ranked search engine results set to the user; and
updating or creating a new content association record during the use of the text index by associating a particular electronic document with the user-defined text search terms, and selected pre-determined semantic definition of the user-defined text search terms, used to locate the particular electronic document, and wherein new term association records are updated or created during the use of the text index by enabling the user to select pre-determined semantic definitions for association with user-defined text search terms.

18. A method of displaying a semantically associated text search result from a search engine, using a text index comprising:
one or more content records corresponding to an electronic document, the content records identifying one or more text search terms present within the electronic document;
one or more term association records associating a text term present within the electronic document identified by a content record with a pre-determined semantic definition of the text term;
one or more content association records linking a term association record of the one or more term association records with a content record of the one or more content records;
said method comprising:
enabling a user to select, in a search engine, one or more user-defined text search terms desired to be located;
for user-defined text search terms having term association records within the text index, iteratively presenting to the user a list of pre-determined semantic definitions associated with each of the one or more user-defined text search terms and enabling the user to select a pre-determined semantic definition of those one or more user-defined text search terms;
searching the content association records contained within the text index using user-defined text search terms to locate electronic documents previously catalogued as containing the one or more user-defined text search terms in association with the selected pre-determined semantic definition, to form a semantically relevant results set;
executing a text search against the search engine for the selected user-defined text search terms, to form a search engine results set;
combining the search engine results set and the semantically relevant results set, to yield a combined results set;
displaying the combined results set to the user; and
updating or creating a content association record during the use of the text index by associating a particular electronic document with the user-defined text search terms, and selected pre-determined semantic definition of the user-defined text search terms, used to locate the particular electronic document, and wherein new term association records are updated or created during the use of the text index by enabling the user to select pre-determined semantic definitions for association with user-defined text search terms.

19. The method of claim 16 further comprising enabling the user to select pre-determined semantic definitions from the text index for association with user-defined text search terms where there are not already semantic associations represented by term association records.

20. The method of claim 19 wherein additional term association records are created within the text index corresponding to the user-defined text search terms and the pre-determined semantic definitions.

21. The method of claim 16 wherein a user interface displaying the semantically relevant results set uses a standalone computer software at a personal computer to connect to the text index.

22. The method of claim 16 wherein a user interface displaying the semantically relevant results set uses a browser plug-in in conjunction with the search engine, and the browser plug-in in addition operates in conjunction with the search engine connects by network to the text index.

23. The method of claim 16 further comprising enabling the user to promote, demote or otherwise indicate the semantic relevance of one or more contents of the semantically relevant results set upon the display thereof, and adjusting the content association records of the text index with respect to the electronic document based upon such user input.

24. The method of claim 16 wherein at least one user-defined text search term is associated with more than one pre-determined semantic definition within the text index.

25. The method of claim 16 wherein a display of the semantically relevant results set to the user enables the user to navigate directly to the electronic documents associated with the semantically relevant results set.

26. The method of claim 25 wherein the electronic documents are webpages and navigation to those electronic documents is accomplished by presentation of hyperlinks to the locations of those webpages along with the remainder of the display of the semantically relevant results set.

27. The method of claim 16 wherein the user selects a pre-determined semantic definition for each text search term entered.

28. The method of claim 16 wherein the user does not select a pre-determined semantic definition for each user-defined text search term entered.

29. The method of claim 17 wherein a user interface comprises the addition of interface elements to a search engine interface that presents pre-determined semantic definitions from term association records for selection by the user within the search engine interface.

30. The method of claim 17 wherein the search engine enables the reordering of a display of the ranked search engine results set based upon the semantic ranking for reordered display of the search engine results set to the user.

31. The method of claim 17 wherein the search engine displays a ranking indicator for each record within the ranked search engine results set displayed to the user.

32. The method of claim 16 wherein a text catalog identifying the presence of text search terms within electronic documents is hosted within the remainder of the text index.

33. The method of claim 16 wherein a text catalog identifying the presence of text search terms within electronic documents is a separate data structure outside of the text index, operably connected thereto.

34. A computer readable memory having recorded thereon statements and instructions for execution by a data processing system to carry out the method of claim 16.

35. The computer readable memory of claim 34 wherein the statements and instructions for execution by the data processing system contained thereon are software for operation on a standalone computer.

36. The computer readable memory of claim 34 wherein the statements and instructions for execution by the data processing system contained thereon are embodied in a browser plug-in for use on an Internet browser program in conjunction with a search engine website system.

37. A data processing system for displaying a semantically associated text search result of a plurality of electronic documents, said data processing system comprising:
   at least one processor;
   a memory operatively coupled to the at least one processor;
   a display device operative to display data; and
   a program module stored in the memory and operative for providing instructions to the at least one processor, the at least one processor responsive to the instructions of the program module,
   wherein the program module is configured to access a text index comprising:
      one or more content records corresponding to an electronic document, the content records identifying one or more text search terms present within the electronic document;
      one or more term association records associating a text term present within the electronic document identified by a content record with a pre-determined semantic definition of the text term;
      one or more content association records linking a term association record of the one or more term association records with a content record of the one or more content records;
   wherein the program module is further configured for:
      enabling a user to select, in a search engine, one or more user-defined text search terms desired to be located within the text index;
      for user-defined text search terms having term association records within the text index, iteratively presenting to the user a list of pre-determined semantic definitions associated with each of the one or more user-defined text search terms and enabling the user to select a pre-determined semantic definition of those one or more user-defined text search terms;
      searching the content association records contained within the text index using the user-defined text search terms to locate electronic documents previously catalogued as containing the one or more user-defined text search terms in association with the selected pre-determined semantic definition, to form a semantically relevant results set;
      displaying the semantically relevant results set to the user; and
      updating or creating a content association record during the use of the text index by associating a particular electronic document with the user-defined text search terms, and selected pre-determined semantic definition of the user-defined text search terms, used to locate the particular electronic document, and wherein new term association records are updated or created during the use of the text index by enabling the user to select pre-determined semantic definitions for association with user-defined text search terms.

38. The data processing system of claim 37 wherein the program module is further configured to execute a text search of the selected user-defined text search terms against a search engine to yield a search engine results set, and then order the returned search engine results set based upon the semantically relevant results set returned from the search of the text index, the re-ordered search engine results set being the semantically relevant results set displayed to the user.

39. The data processing system of claim 37 wherein the program module is a browser plug-in.

40. The data processing system of claim 37 wherein the program module is a standalone computer software and the data processing system itself is a personal computer operatively connected via a network to the text index.

41. A method of associating pre-determined semantic definitions with user-defined text search terms contained within at least one electronic document, the method comprising:
   receiving user input in a search engine indicating at least one user-defined text search term desired to be located in at least one electronic document;
   iteratively presenting to a user at least one pre-determined semantic definition for the at least one user-defined text search term from a plurality of term association records contained within a text index, each term association record corresponding to one pre-determined semantic definition for the user-defined text search term;
   enabling the user to iteratively select the desired pre-determined semantic definition for each at least one user-defined text search term;
   executing a text search for the user-defined text search terms against a text catalog containing the text contents of electronic documents, to return a text search result;

enabling the user to select one or more results from the text search result satisfying a search criteria of the user;

creating or updating content association records, based upon a positive selection of results from the text index search, within the text index for each user-defined text search term for which a pre-determined semantic definition was selected by the user, linking the electronic document with the selected pre-determined semantic definitions for the user-defined text search terms used to reach that result;

creating or updating term association records during the use of the text index by enabling the user to select pre-determined semantic definitions for association with user-defined text search terms; and wherein the content association records created or updated within the text index are subsequently searched using user-defined text search terms to locate at least one electronic document previously catalogued as containing the one or more user-defined text search terms in association with the selected pre-determined semantic definitions to deliver semantically relevant text search results.

42. The method of claim 41 wherein more than one user-defined text search term corresponds to one pre-determined semantic definition.

43. The method of claim 41 wherein a user-defined text search term corresponds to more than one pre-determined semantic definition.

44. The method of claim 41 wherein a user interface with the user takes place through a browser plug-in on a Web browser at a personal computer of the user, operatively connected to a remainder of a website system.

45. The method of claim 41 wherein a user interface with the user takes place through a browser plug-in on a Web browser at a personal computer of the user, operating as an overlay to an Internet search engine with an appropriate application programming interface.

46. The method of claim 41 wherein a user interface with the user takes place through standalone computer software on a personal computer that is operatively connected to a remainder of the system via a computer network.

47. The method of claim 41 wherein the user is enabled to select a new pre-determined semantic definition for association with a text search term where the proper term association record does not already exist within the text index.

48. The method of claim 47 wherein a new term association record is created within the text index based upon the selection of a new pre-determined semantic definition for association with the user-defined text search term.

49. A data processing system for associating pre-determined semantic definitions with user-defined text search terms contained within at least one electronic document, said data processing system comprising:

at least one processor;

a memory operatively coupled to the at least one processor;

a program module stored in the memory and operative for providing instructions to the at least one processor, the at least one processor responsive to the instructions of the program module;

the program module configured for:

receiving user input in a search engine indicating at least one user-defined text search term desired to be located in at least one electronic document;

iteratively presenting to a user at least one pre-determined semantic definition for at least one user-defined text search term from a plurality of term association records contained within a text index, each term association record corresponding pre-determined to one semantic definition for the at least one user-defined text search term;

enabling the user to iteratively select a desired pre-determined semantic definition for each at least one user-defined text search term;

executing a text search for the user-defined text search terms against a text catalog containing text contents of electronic documents, to return a text search result;

enabling the user to select one or more results from the text search result satisfying a search criteria of the user;

creating or updating content association records, based upon a positive selection of results from the text index search, within a text index for each user-defined text search term for which a pre-determined semantic definition was selected by the user, linking the electronic document with the selected pre-determined semantic definitions for the user-defined text search terms used to reach that result;

creating or updating term association records during the use of the text index by enabling the user to select pre-determined semantic definitions for association with user-defined text search terms; and wherein the content association records created or updated within the text index are subsequently searched using user-defined text search terms to locate at least one electronic document previously catalogued as containing the one or more user-defined text search terms in association with the selected pre-determined semantic definitions to deliver semantically relevant text search results.

50. The data processing system of claim 49 wherein more than one user-defined text search term corresponds to one pre-determined semantic definition.

51. The data processing system of claim 49 wherein a user-defined text search term corresponds to more than one pre-determined semantic definition.

52. The data processing system of claim 49 wherein the user is enabled to select a new pre-determined semantic definition for association with a user-defined text search term where the proper term association record does not already exist within the text index.

53. The data processing system of claim 52 wherein a new term association record is created within the text index based upon the selection of a new pre-determined semantic definition for association with the user-defined text search term.

54. A method of providing combined search engine results, the method comprising:

enabling a user to enter user-defined search query parameters through a first search engine system and interface;

executing a search against the contents of a first content database using the user-defined search query parameters, to return a first results set;

passing the user-defined search query parameters from the first search engine system to at least one additional separate search engine system and executing searches against the content databases of said additional separate search engine systems to return at least one additional results set, based on a user selection of one or more of a plurality of pre-determined semantic definitions stored in association with the search query parameters and iteratively presented to the user;

returning the additional results sets to the first search engine system, the additional results sets including one of a plurality of electronic documents;

combining the first results set and the additional results sets for display to the user as a single end search result; and updating or creating content association records, based on the user selection of the one or more pre-determined semantic definitions, which associate the selected one or more of the pre-determined semantic definitions for the user-defined search query parameters and selected one of the plurality of electronic documents;

updating or creating term association records, based on the use of search engine system by enabling the user to select pre-determined semantic definitions for association with the user-defined search query parameters; and wherein the content association records created or updated are subsequently searched using user-defined search query parameters to locate at least one electronic document previously catalogued as containing the one or more user-defined search query parameters in association with the selected pre-determined semantic definitions to deliver a subsequent results set.

55. The method of claim 54 further comprising reordering the single end search result before display to the user.

56. The method of claim 54 wherein the search query parameters include semantically associated user-defined text search terms.

57. A computer readable memory having recorded thereon statements and instructions for execution by a data processing system to carry out the method of claim 50.

\* \* \* \* \*

UNITED STATES PATENT AND TRADEMARK OFFICE
Certificate

Patent No. 8,799,265 B2                                                                                                              Patented: August 5, 2014

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Bruce Johnson, Sherwood Park (CA); Chad Frederick, Edmonton (CA); Scott Montgomerie, Edmonton (CA); Allen Yee, Edmonton (CA); and Reginald Cheramy, Edmonton (CA).

Signed and Sealed this Twenty-fifth Day of November 2014.

VINCENT N. TRANS
*Supervisory Patent Examiner*
Art Unit 2100
Technology Center 2100